(12) United States Patent
Ramachandran et al.

(10) Patent No.: US 7,936,997 B2
(45) Date of Patent: May 3, 2011

(54) METHOD AND APPARATUS FOR LOW CHIRP TRANSMITTER FOR OPTICAL FIBER COMMUNICATIONS

(75) Inventors: Mani Ramachandran, San Jose, CA (US); Hermann Gysel, San Jose, CA (US); Chandra Jasti, San Jose, CA (US)

(73) Assignee: Innotrans Communications, Inc., San Jose, CA (US)

( * ) Notice: Subject to any disclaimer, the term of this patent is extended or adjusted under 35 U.S.C. 154(b) by 901 days.

(21) Appl. No.: 11/800,063

(22) Filed: May 2, 2007

(65) Prior Publication Data

US 2008/0273874 A1 Nov. 6, 2008

(51) Int. Cl.
*H04B 10/12* (2006.01)
(52) U.S. Cl. .................. 398/193; 398/192; 398/194
(58) Field of Classification Search ........... 398/182–201
See application file for complete search history.

(56) References Cited

U.S. PATENT DOCUMENTS

| | | | |
|---|---|---|---|
| 5,325,225 A | | 6/1994 | Suzaki et al. |
| 5,453,867 A | | 9/1995 | Ohya et al. |
| 5,663,823 A | | 9/1997 | Suzuki |
| 6,091,864 A | | 7/2000 | Hofmeister |
| 6,252,693 B1 | * | 6/2001 | Blauvelt ................ 398/194 |
| 6,304,353 B1 | | 10/2001 | Gehlot |
| 6,760,142 B2 | | 7/2004 | Leuthold et al. |
| 2003/0016415 A1 | * | 1/2003 | Jun et al. ................ 359/133 |
| 2004/0076199 A1 | | 4/2004 | Wipiejewski et al. |
| 2005/0036792 A1 | * | 2/2005 | Frederiksen et al. ...... 398/193 |
| 2006/0210282 A1 | * | 9/2006 | Iannelli ................ 398/186 |

OTHER PUBLICATIONS

Dye, S. (Nov.-Dec. 1995). "Mach-Zehnder External Modulator Linearization Techniques," *International Journal of Optoelectronics* 10(6):455-459.
Invitation to Pay Additional Fees dated Sep. 3, 2008, for PCT Application No. PCT/US2008/005547 filed Apr. 29, 2008, three pages.
Anonymous (2006). "Electro-optic modulator," located at <http://en.wikipedia.org/wiki/Electro-optic_modulator>, last visited on Nov. 7, 2006, first page only.
Anonymous (2006). "General Photonics Corporation—LiNbO3 Phase Modulator," located at <http://www.generalphotonics.com/GP%20Modulator.htm>, last visited on Nov. 7, 2006, first page only.
Griffin, R.A. et al. (1999). "Radio-Over-Fiber Distribution Using an Optical Millimeter-Wave/DWDM Overlay," *Optical Fiber Communication Conference, 1999, and the International Conference on Integrated Optics and Optical Fiber Communication. CFC/IOOC '99*, San Diego, CA, Feb. 21-26, 1999, 2:WD6-1-WD6-3.
International Search Report mailed Dec. 16, 2008, for PCT Application No. PCT/US2008/005547 filed Apr. 29, 2008, six pages.

* cited by examiner

*Primary Examiner* — Dzung D Tran
(74) *Attorney, Agent, or Firm* — Morrison & Foerster LLP

(57) ABSTRACT

A directly modulated optical transmitter for use with a fiber optical communications system operating in the 1550 nm wavelength band exhibits very low chirp. The chirp inherently present in a directly modulated laser is cancelled by a phase modulator which optically modulates the directly modulated laser light beam by applying a 180° phase delay to a split-off portion of the input radio frequency signal. This provides a low cost transmitter capable of operating in the 1550 nm band and with laser chirp effectively cancelled or substantially reduced, thereby avoiding distortions due to laser chirp interactions with the downstream optical fiber.

28 Claims, 7 Drawing Sheets

METHOD AND APPARATUS FOR LOW CHIRP TRANSMITTER FOR OPTICAL FIBER COMMUNICATIONS

FIELD OF THE INVENTION

This invention relates to optical transmission systems, for instance those using a laser or laser diode to transmit optical (light) signals over optical fibers and in particular to such a system using a directly modulated laser in the transmitter.

DESCRIPTION OF RELATED ART

Directly modulating the analog output signal intensity of a light emitting laser diode (LED) or semiconductor laser or other type of laser with an electrical signal is well known in the field. Typically this is used for transmitting optical analog signals such as voice and video, such as cable television, on optical fibers. Although such analog transmission techniques have the advantage of substantially smaller bandwidth requirements than digital transmission, such as digital pulse code modulation, or analog or pulse frequency modulation, such use of amplitude modulation tends to suffer from noise and nonlinearity of the optical transmitter.

Exemplary types of analog signals thereby transmitted are analog video signals which carry information in amplitude modulation (AM) format and specifically AM-VSB (AM-Vestigial Side Band) format. In order to transmit multiple video signals, such AM-VSP signals are up-converted to specific frequency. The collection of such signals is referred to as a composite signal and occupies a typical (radio frequency—RF) frequency range from 54 MHz to 1 GHz. Carrying such signals over fiber optic cables with the required linearity typically requires special transmitters.

The transmitters are classified into direct modulation or external modulation type. Direct modulation transmitters are of the type where the input composite radio frequency analog (electrical) signal changes the optical output power of the laser or laser diode by changing its bias current in proportion to the instantaneous amplitude of the composite signal. Externally modulated transmitters use another device known as the modulator to perform the modulation function on the optical (light) signal from the laser. In such transmitters the laser bias current is normally held constant. Instead, the analog RF electrical signal, which is the information, to be transmitted, is applied to the electrical input terminal of the modulator, also known as an electro-optic modulator. Such an electro-optic modulator is an optical device in which a single controlled element displaying electro-optic effect is used to electrically modulate a beam of light, typically laser light. The modulation may be imposed on the phase, frequency, amplitude or direction of the modulated light beam. Typically a nonlinear optical material is used in the optic modulator and is, for instance, a crystal such as lithium niobate. The most common type of electro-optic modulator includes such a crystal whose refractive index is a function of the strength of the local electric field. Thus, if the lithium niobate crystal is exposed to an electric field, light travels more slowly through it. However the phase of light leaving the crystal is directly proportional to the length of time it takes the light to pass through it. Therefore the phase of the laser light beam exiting the modulator is controlled by changing the strength of the electric field in the crystal by the applied analog RF (electrical) signal.

Both types of modulation have advantages and disadvantages. The externally modulated transmitter has the advantage of low chirp, where chirp is an abrupt undesirable change in the laser beam's center wavelength caused by laser instability. This chirp is typically caused by variations in the applied bias current, which is inherent in a directly modulated laser. Hence externally modulated lasers usually have a low chirp since there is typically little change in the bias current. Externally modulated lasers also have relatively little signal-to-noise degradation even though the length of the optical fiber which the transmitter is driving may vary. The laser itself need not be particularly linear in operation and external modulators operate well at the 1550 nm optical wavelength, which is standard for optical transmission networks. Externally modulated transmitters are more complex, expensive and have lower modulation depth (are less linear) than directly modulated transmitters. Also, suppression of stimulated Brillouin scattering (SBS) is difficult. SBS is a well-known distortion in optical signals.

In contrast, directly modulated lasers are less complex, less costly, and more linear in operation. Disadvantageously, heretofore they do not work well at the 1550 nm optical wavelength. They do work well at the 1310 nm wavelength, however optical amplifiers for 1310 nm light are generally not commercially available, making 1310 nm difficult to use.

The issue with chirp is that it interacts with the dispersion in the optical fiber to produce undesirable distortions, primarily CSO (Composite Second Order) distortions, that fall in band in multi-octave (wideband) systems such as cable television. Because of these various advantages and disadvantages, typically directly modulated lasers heretofore have been used almost exclusively at the 1310 nm optical wavelength where standard fiber has no dispersion. Conversely, for a system using 1550 nm wavelength, the transmitters are currently almost all the externally modulated type since the optical fiber has large amounts of dispersion in that wavelength.

The present inventor determined it would be advantageous to have an optical transmitter which is directly modulated with the attendant advantages and which operates at the 1550 nm optical wavelength without suffering from excessive chirp.

A directly modulated laser system is shown in Iannelli US 2006/0210282A1, published Sep. 21, 2006, incorporated by reference herein in its entirety. This shows in FIG. 2 (see also present FIG. 1) a block diagram of a directly modulated laser transmitter 100 with an external cavity laser which does operate in the 1530-1570 nm wavelength range. Iannelli shows the RF electrical signal at terminal 101 is applied to directly modulate laser 102, whose output beam 110 is carried by fiber to be incident on phase modulator 109, and passed into fiber optic link 113 via optical amplifier 112. A split off part of the RF electrical signal is applied to attenuator 104, tilt circuit 106, and phase delay circuit 107, to drive phase modulator 109. SBS suppression tone generator 108 is also provided. The phase delay is only 0° to −10°, see paragraph 49, to maximize the CSO which is a property of the optical fiber span, rather than only the laser. In addition to being limited to the external cavity type laser, it appears that chirp correction here would be inadequate for a directly modulated laser (e.g., DFB) which generally requires more chirp correction.

SUMMARY

In accordance with the invention, there is provided a directly modulated optical transmitter operating at the 1550 nm optical wavelength band (extending for instance from 1530 run to 1570 nm but not so limited) that exhibits very low chirp in the transmitter and is suitable for use in optical fiber networks. While it is recognized, as pointed out above, that directly modulated laser systems inherently produce chirp, which is an unwanted modulation (change) of the laser optical wavelength, the present optical transmitter overcomes this by canceling the chirp induced by the directly modulated laser itself by means of a phase modulator which optically modulates a phase of the light beam output from the directly modulated laser. The chirp is canceled by use of a combination of an integrator, electrical delay element, and an electrical amplifier, which receive a portion of the RF signal also used to drive the laser, and which apply an approximately 180° phase delay and the resulting electrical signal is then used to drive the phase modulator to offset or cancel the chirp induced by the laser itself.

In one embodiment, the transmitter includes a plurality of directly modulated lasers, each outputting light as a different wavelength, e.g., in the 1550 nm band, and each driven by two radio frequency (RF) signals, one being, e.g., a common analog composite RF signal and the other being, e.g., a QAM (quadrature amplitude modulation) signal, the information content of which differs for each laser, thereby also supporting what is called in the cable television field narrowcasting of the QAM signals.

DETAILED DESCRIPTION OF THE INVENTION

Figure 1:
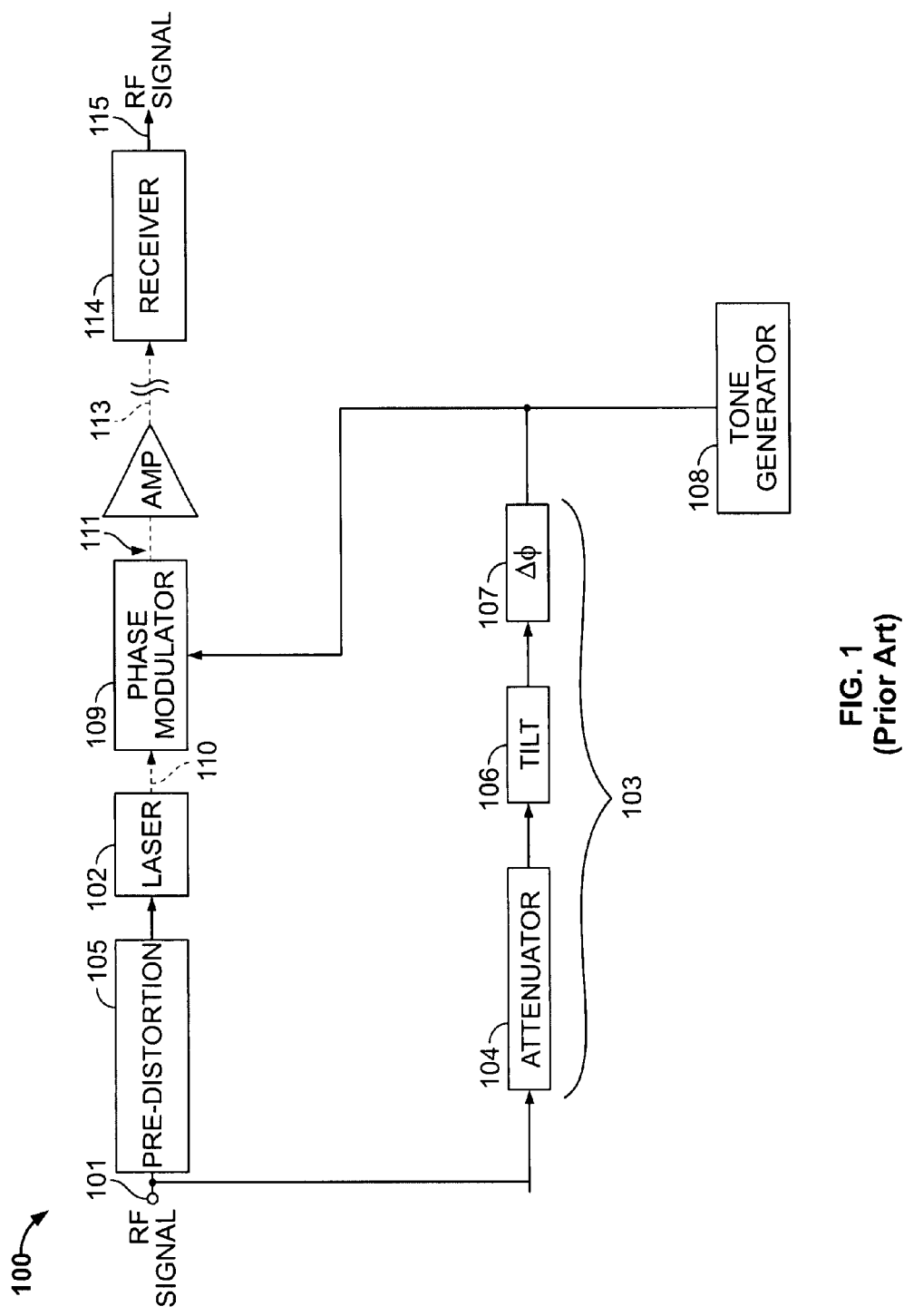
FIG. 1 shows a prior art directly modulated transmitter.
Figure 2:
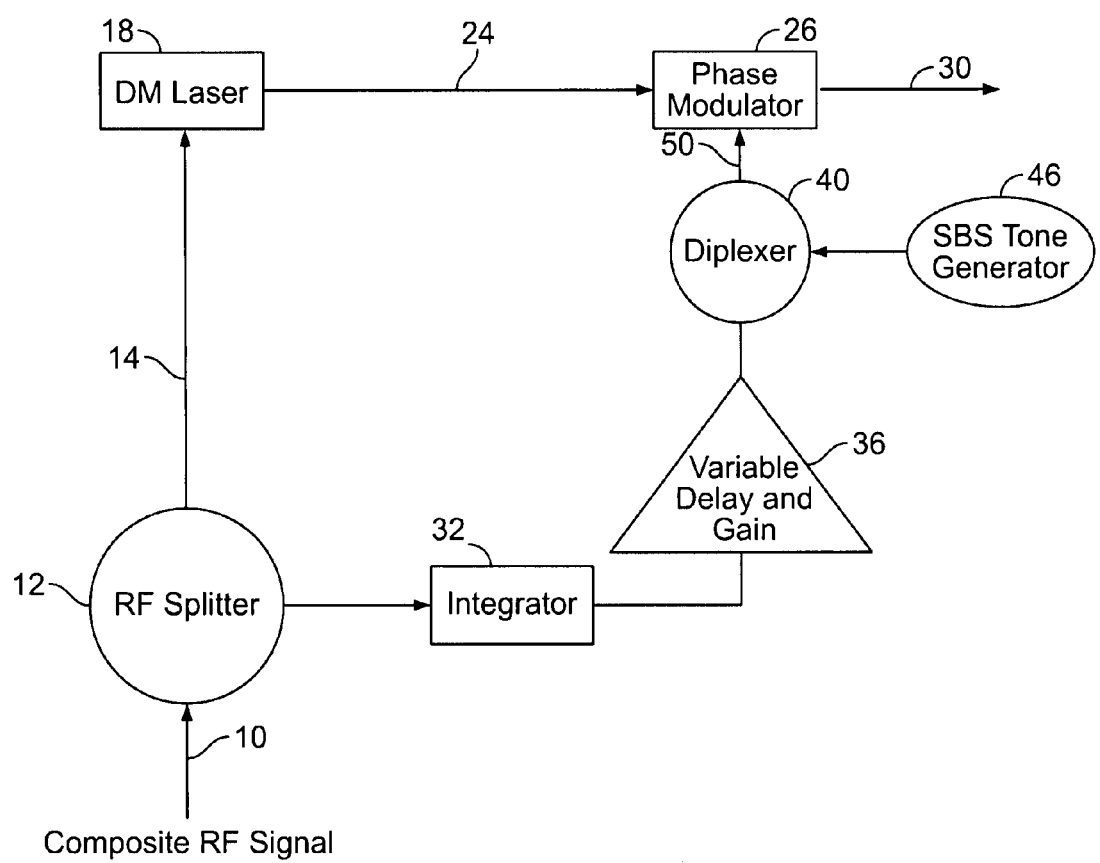
FIG. 2 shows a block diagram of a transmitter in accordance with this disclosure.

FIG. 2 shows in a block diagram an optical transmitter in accordance with this disclosure. The various components are each of standard type, commercially available, and well known in the field. The remainder of the system, including the fiber optic span and the optical receiver, are also conventional as in FIG. 1. Hence FIG. 2 (unlike FIG. 1) only shows the transmitter. As shown, there is input terminal 10 to which is applied a composite RF (electrical) signal such as a cable television signal, which may include many channels of analog cable television transmissions or other types of signals, including for instance a QAM signal. The composite RF signal may be an analog video signal or a digital video signal such as QAM (Quadrature Amplitude Modulation). Thus the present apparatus is suitable for use with digital signals also. The input composite RF electrical signal is applied to a radio frequency splitter tap coupler 12 which is a standard device. The RF splitter/RF coupler 12 passes the bulk of the signal on, via for instance a coaxial cable or similar transmission line 14, to a conventional directly modulated laser 18. Thus the RF signal applied on line 14 directly modulates the bias current of the laser 18 such as part no. CQF-935 from JDSU Company via the power supply (not shown) of laser 18. The directly modulated laser 18 which is for instance a semiconductor laser, laser diode or other type of laser, such as a direct feedback laser, all commercially available, outputs a beam of coherent light 24 having a center wavelength in the 1550 nm band typically into a short length of optical fiber. This optical beam 24 may be incident on a collimating lens (not shown) if needed. Beam 24 then passes via optical fiber into a phase modulator 26 which is a standard type device as described above. An exemplary phase modulator is available from General Photonics Inc., for instance their part number LPM-001. A variety of similar devices are available from other vendors. The resulting phase modulated optical signal (coherent light beam) 30 is then emitted from the phase modulator and coupled to the fiber optic span which is ultimately in communication with a suitable optical receiver, not shown, as in FIG. 2.

Referring back to RF splitter/RF coupler 12, the smaller part of the electrical RF signal is applied to an integrator component 32 which is a two port network having particular transfer characteristics in one embodiment across the frequency band 50 to 1000 MHz. The transfer characteristics of the network are empirically derived to provide the optimum cancellation of the chirp in that frequency band. The electrical output signal of the network is then applied to a gain amplifier 36. The optimum gain of this amplifier is achieved using attenuators and coaxial cables of varied delays. The resulting amplified/attenuated and delayed signal (in other words, phase altered) is applied to an input terminal of a conventional diplexer 40 which is a type of signal combiner. Applied to the other input terminal of diplexer 40 is a SBS tone suppression signal applied from the SBS tone generator 46 which is for instance an oscillator coupled to a narrow band amplifier from Sirenza Inc. This phase adjusting signal with the added SBS tone suppression is applied by diplexer 40 to the electrical input terminal 50 of phase modulator 26 to drive the phase modulator. The mathematical derivation supplied below shows that the FM signal in the laser output signal (the chirp) is canceled in the modulator when the delays, amplitudes, and phases are matched.

This transmitter has the advantages of being lower cost than a typical externally modulated transmitter, having a higher modulation depth than an externally modulated transmitter, and having a very high SBS threshold that allows high optical power signal (e.g., more than 23 dBm) to be inserted into a 25 kilometer long span of standard optical fiber.

Note that in accordance with this invention the chirp suppression is of the chirp actually induced by the frequency excursions of the laser 18 caused by the applied AM RF signal. This chirp is advantageously canceled or reduced. Typically the amount of phase delay provided by the amplifier 36 is approximately 180° so as to cause full cancellation of the amplitude of the chirp caused by the laser 18. This the cancellation effect is provided by the electrical signal at electrical input terminal 50 of the phase modulator 26 being identical in amplitude and having a 180° phase differential from the chirp present (in optical form) in the optical signal 24. Hence typically the amplifier 36 provides an approximately 180° phase differential. The amplitudes of the two signals are matched while finding the best cancellation of the CSO distortion across the frequency band, e.g. 50 to 1000 MHz.

It is understood that the present method and apparatus are suitable also for carrying microwave signals as well as for very high-speed digital signals. In one embodiment the phase modulator may include the laser in a single package as an integrated device.

The following describes in more detail operation of the FIG. 2 transmitter. The input RF signal at terminal 10 is a composite of several frequencies and is represented as s(t).

$$s(t) = \sum_{i=1}^{n} \cos(\omega_i t + \varphi_i) \qquad (1)$$

where $\omega_i$ and $\varphi_i$ are the various RF (e.g. CATV) frequencies and the phases respectively. This composite signal is used to directly modulate laser 18 which also produces laser chirp.

By directly modulating the laser 18, the light intensity of beam 24 from the laser is modulated. However due to the chirp, the laser frequency is also modulated. This leads to the undesirable frequency deviation of the carrier (RF) which is proportional to that of the input information signal at terminal 10. This signal is represented as follows:

$$I = I_0(1 + m*s(t))*\cos\left[\omega_c t + k_f \int_{-\infty}^{t} s(\tau)d\tau\right] \quad (2)$$

$$I = I_0\left(1 + m*\sum_{i=1}^{n} \cos(\omega_i t + \varphi_i)\right)*\cos\left(\omega_c t + k_f \sum_{i=1}^{n} \frac{\sin(\omega_i t + \varphi_i)}{\omega_i}\right) \quad (3)$$

where $k_f$ is the frequency modulation factor. This modulated light is passed through the phase modulator 26. As this light passes through the optical fiber (the laser 18 pigtail which is the laser output port and the phase modulator 26 input optical fiber) it accumulates some delay. The phase modulator 26 modulates the phase of the carrier with the signal that is applied to it at terminal 50. The signal that is applied to the phase modulator at terminal 50 follows an electrical path through electrical components 32, 36, 40 and hence acquires some delay. Thus a differential delay between the two signals paths is established. This differential delay is labeled $\tau_{diff}$. Then equations 2 and 3 modify as follows:

$$I = I_0(1 + m*s(t))*\cos\left[\omega_c t + k_f \int_{-\infty}^{t} s(\tau)d\tau + k_p s(t - \tau_{diff})\right] \quad (4)$$

$$I = I_0\left(1 + m*\sum_{i=1}^{n} \cos(\omega_i t + \varphi_i)\right)* \cos\left(\begin{array}{c} \omega_c t + k_f \sum_{i=1}^{n} \frac{\sin(\omega_i t + \varphi_i)}{\omega_i} + \\ k_p \sum_{i=1}^{n} \cos[\omega_i(t - \tau_{diff}) + \varphi_i] \end{array}\right) \quad (5)$$

Eq. 5 shows the carrier $$\cos\left(\omega_c t + k_f \sum_{i=1}^{n} \frac{\sin(\omega_i t + \varphi_i)}{\omega_i} + k_p \sum_{i=1}^{n} \cos[\omega_i(t - \tau_{diff}) + \varphi_i]\right)$$

has two associated terms which have to be cancelled to cancel the original chirp generated by the laser. This cancellation is possible only if the term $$k_f \sum_{i=1}^{n} \frac{\sin(\omega_i t + \varphi_i)}{\omega_i}$$

and the term $$\sum_{i=1}^{n} k_p \cos[\omega_i(t - \tau_{diff}) + \varphi_i]$$

are identical in amplitude and have a 180 degree phase differential. In order to achieve this, the electrical signal before being applied to the phase modulator 26 is passed through an integrator 32 and an amplifier 36 that causes a 180 degree phase differential. Equation 5 would then become $$I = I_0\left(1 + m*\sum_{i=1}^{n} \cos(\omega_i t + \varphi_i)\right)* \quad (6)$$

$$\cos\left(\begin{array}{c} \omega_c t + k_f \sum_{i=1}^{n} \frac{\sin(\omega_i t + \varphi_i)}{\omega_i} - \\ k_p \sum_{i=1}^{n} \frac{\sin[\omega_i(t - \tau_{diff}) + \varphi_i]}{\omega_i} \end{array}\right)$$

First, the amplitudes of the two terms $$k_f \sum_{i=1}^{n} \frac{\sin(\omega_i t + \varphi_i)}{\omega_i} \text{ and } k_p \sum_{i=1}^{n} \frac{\sin[\omega_i(t - \tau_{diff}) + \varphi_i]}{\omega_i}$$

should match so they are balanced. The second term critical for cancellation is the differential delay between the two signal paths. If $\tau_{diff} \neq 0$ then the two terms in equation 6 associated with the carrier add to a term that has a frequency dependence in cancellation. The differential delay $\tau_{diff}$ is adjusted to zero by making the electrical path lengths traversed by the two electrical signals the same. When perfect cancellation is thus achieved the final signal optical before launching into the fiber span would have the following form:

$$I = I_0\left(1 + m*\sum_{i=1}^{n} \cos(\omega_i t + \varphi_i)\right)*\cos(\omega_c t) \quad (7)$$

A multi-tone analysis in parallel to the foregoing follows. The input RF signal at terminal 10 is a composite of several frequencies and is represented as s(t).

$$s(t) = \cos(\omega_1 t) + \cos(\omega_2 t) \quad (1)$$

where $\omega_1$ and $\omega_2$ are two frequencies. For simplicity we have made their arbitrary phases $\phi_1$ and $\phi_2$ as zeros. This signal is used to directly modulate a laser 18 which also produces laser chirp. By directly modulating the laser 18 the light intensity out of the laser is modulated. However due to the chirp, the laser frequency is also modulated. This leads to the frequency deviation of the carrier which is proportional to the information signal. This signal is represented as follows:

$$I = I_0(1 + m*s(t))*\cos\left[\omega_c t + k_f \int_{-\infty}^{t} s(\tau)d\tau\right] \quad (2)$$

$$I = I_0\left\{1 + m*\left[\begin{array}{c}\cos(\omega_1 t) + \\ \cos(\omega_2 t)\end{array}\right]\right\}*\cos\left(\omega_c t + k_f\left[\frac{\sin(\omega_1 t)}{\omega_1} + \frac{\sin(\omega_2 t)}{\omega_2}\right]\right) \quad (3)$$

where $k_f$ is the frequency modulation factor. This modulated light is passed through the phase modulator 26. As this light passes through the fiber (laser 18 pigtail and phase modulator 26 input fiber) it accumulates some delay. The phase modulator 26 modulates the phase of the carrier with the signal that is applied to it. The signal that is applied to the phase modulator 26 follows an electrical path through electrical components 32, 36, 40 and hence acquires some delay. Thus a differential delay between the two signals paths is established. This differential delay is labeled $\tau_{diff}$. Then equations 2 and 3 modify as follows:

$$I = I_0(1 + m*s(t))* \qquad (4)$$
$$\cos\left[\omega_c t + k_f \int_{-\infty}^{t} s(\tau)d\tau + k_p s(t - \tau_{diff})\right]$$

$$I = I_0\left\{1 + m*\left[\begin{array}{c}\cos(\omega_1 t)+\\ \cos(\omega_2 t)\end{array}\right]\right\}* \qquad (5)$$
$$\cos\left(\begin{array}{c}\omega_c t +\\ k_f\left[\dfrac{\sin(\omega_1 t)}{\omega_1} + \dfrac{\sin(\omega_2 t)}{\omega_2}\right]+\\ k_p\left[\begin{array}{c}\cos(\omega_1\{t-\tau_{diff}\})+\\ \cos(\omega_2\{t-\tau_{diff}\})\end{array}\right]\end{array}\right)$$

Eq. 5 shows the carrier $$\cos\left(\omega_c t + k_f\left[\dfrac{\sin(\omega_1 t)}{\omega_1} + \dfrac{\sin(\omega_2 t)}{\omega_2}\right] + k_p\left[\begin{array}{c}\cos(\omega_1\{t-\tau_{diff}\})+\\ \cos(\omega_2\{t-\tau_{diff}\})\end{array}\right]\right)$$

has two associated terms which have to be cancelled to cancel the original chirp generated by the laser. This cancellation is possible only if the term $$k_f\left[\dfrac{\sin(\omega_1 t)}{\omega_1} + \dfrac{\sin(\omega_2 t)}{\omega_2}\right]$$

and the term $k_p[\cos(\omega_1\{t-\tau_{diff}\})+\cos(\omega_2\{t-\tau_{diff}\})]$ are identical in amplitude and have a 180 degree phase differential. In order to achieve this, the signal before being applied to the phase modulator 26 is passed through an integrator 32 and an amplifier 36 that causes a 180 degree phase differential. Equation 5 would then become $$I = I_0\left\{1 + m*\left[\begin{array}{c}\cos(\omega_1 t)+\\ \cos(\omega_2 t)\end{array}\right]\right\}* \qquad (6)$$
$$\cos\left(\begin{array}{c}\omega_c t +\\ k_f\left[\dfrac{\sin(\omega_1 t)}{\omega_1} + \dfrac{\sin(\omega_2 t)}{\omega_2}\right]-\\ k_p\left[\dfrac{\sin(\omega_1\{t-\tau_{diff}\})}{\omega_1} + \dfrac{\sin(\omega_2\{t-\tau_{diff}\})}{\omega_2}\right]\end{array}\right)$$

The differential delay $\tau_{diff}$ is adjusted to zero by making the electrical path lengths traversed by the two signals the same. This reduces equation 6 as follows:

$$I = I_0\left\{1 + m*\left[\begin{array}{c}\cos(\omega_1 t)+\\ \cos(\omega_2 t)\end{array}\right]\right\}* \qquad (7)$$
$$\cos\left(\omega_c t + k_f\left[\dfrac{\sin(\omega_1 t)}{\omega_1} + \dfrac{\sin(\omega_2 t)}{\omega_2}\right] - k_p\left[\dfrac{\sin(\omega_1 t)}{\omega_1} + \dfrac{\sin(\omega_2 t)}{\omega_2}\right]\right)$$

Now balancing the amplitude factors such that $k_f$ and $k_p$ are identical leads to equation 8.

$$I = I_0[1 + m*\{\cos(\omega_1 t) + \cos(\omega_2 t)\}]*\cos(\omega_c t) \qquad (8)$$

This intensity modulated signal is now launched into the fiber span. Since the laser chip is cancelled, the distortions due to the laser chirp interaction with fiber dispersion can be avoided.

Figure 3:
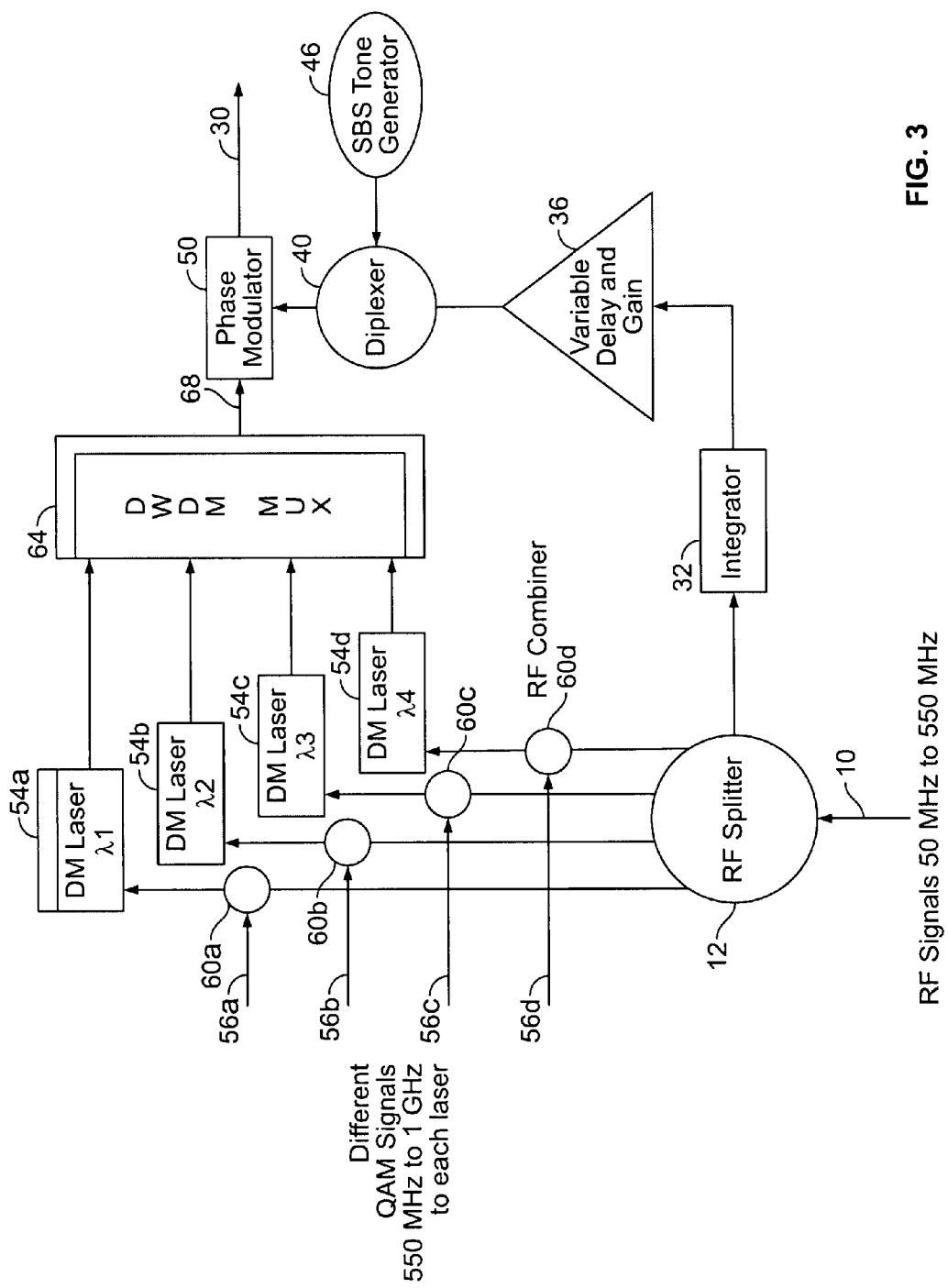
FIG. 3 shows another transmitter in accordance with this disclosure.

FIG. 3 shows an extension of the FIG. 2 transmitter. The FIG. 3 transmitter supports in this example, as does the FIG. 2 transmitter, transmission of the composite analog RF signal input on terminal 10 in a frequency range (which is exemplary) of 50 MHz to 550 MHz. Note that elements in FIG. 3 which are the same as in FIG. 2 are similarly labeled in terms of reference numbers. Additionally, the FIG. 3 transmitter has provisions for input of multiple QAM (quadrature amplitude modulation) RF signals each having differing information content in the exemplary bandwidth of 550 MHz to 1 GHz. These are applied respectively on terminals 56a-56d, so here there (as an example) are four such different QAM signals applied. These are what is called in the cable television field narrowcast signals. Each input narrowcast RF signal is applied to an adder (or combiner) respectively 60a-60d, each operating in the electrical domain, which in turn is respectively coupled to the input port of lasers 54a-54d. As shown, each of these lasers outputs light at a different wavelength in the 1550 nm band, here designated λ1, λ2, λ3 and λ4, respectively. (There is no requirement of using this particular illustrative combination of composite and QAM input RF signals.)

The optical signals output from lasers 54a-54d are each applied to an input port of a conventional DWD (dense wavelength division) multiplexer (or other suitable multiplexer) operating of course in the optical domain, which outputs a combined optical signal on its output port 68, and which in turn is coupled to the optical input port of phase modulator 50. This configuration successfully suppresses the laser chirp of all four lasers simultaneously and thus reduces the CSO degradation of broadcast signals (e.g. 50 to 550 MHz frequencies) carried by the four lasers. Note that again here only one phase modulator 50 is shared by all of these various input RF signals. This is an advantage because it economizes on component count, and hence reduces cost. (Note that the phase modulators are typically one of the relatively more expensive components of such transmitters.) Multiple transmitters of the type of FIG. 2 or FIG. 3 can each drive a single fiber span of a length of 30 Km. Typically each transmitter in such an arrangement has its own unique set of optical wavelengths.

The FIG. 3 transmitter allows multiple signals with unique content in the 550 MHz to 1 GHz frequency range to be carried on a single optical fiber. This arrangement will for instance quadruple the capacity of a fiber optic cable. By operating in the 1550 nm wavelength band, the well known crosstalk problems that limit wavelength division multiplexing (both coarse wavelength division multiplexing and dense wavelength division multiplexing) at other wavelengths are minimized. Also, optical signals at the 1550 nm band can be amplified by conventional EDFAs (erbium doped fiber amplifiers), further reducing system costs. This technique is not limited to the 1550 nm band. A similar technique can be used to transmit multiple DWDM signals in the 1310 nm band. However adequate care should be taken in choosing the DWDM wavelengths in the 1310 nm band. The wavelengths can be placed below, at, or above the dispersion null point which is 1312+/− 6 nm for a single mode fiber. When DWDM signals are placed at the dispersion null point, the FWM (four wave mixing) nonlinearity can be significant. In addition, Raman crosstalk will extend to higher RF frequencies because of the low dispersion, but its magnitude can be limited by choosing smaller wavelength spacing. Since this is well known in optics, the only other option is to place the DWDM wavelengths above or below the dispersion null point. Thus multiple wavelengths can be placed in the 1280 to 1300 nm band or the 1318 to 1332 nm band. In either case, there will be some crosstalk due to a) very low fiber dispersion, b) lower mode field diameter of the fiber at 1310 nm, and c) the need to launch high per wavelength power into the fiber to compensate for higher fiber loss at 1310 nm. This will permit use of this DWDM technique in the 1310 nm band (1270 to 1350 nm), but with some severe limitations on distance, power, number of wavelengths, etc.

Figure 4:
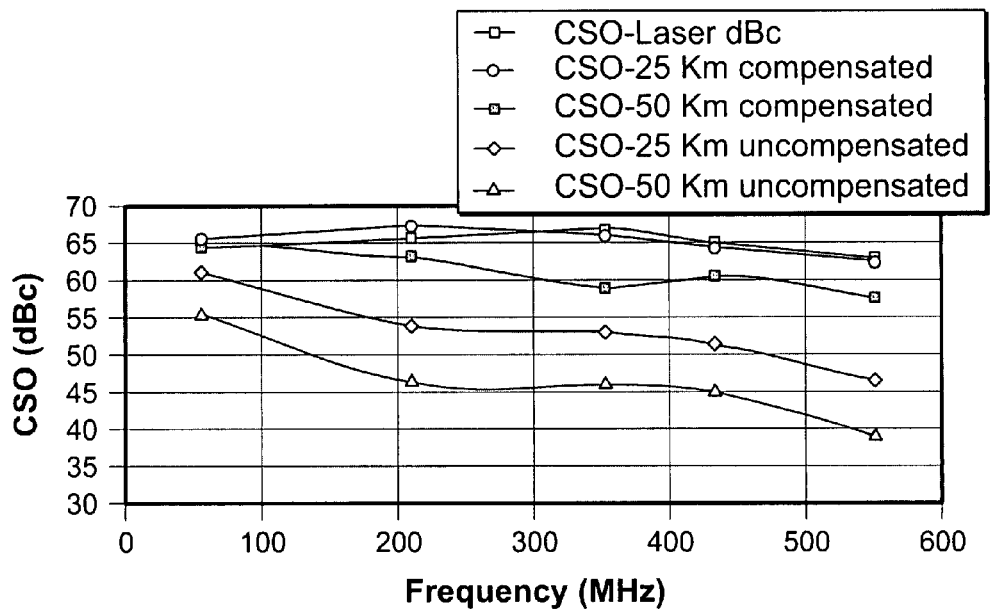
FIGS. 4-10 show performance of the FIG. 2 transmitter graphically.

FIGS. 4-10 show exemplary performance of the transmitter of FIG. 2 under various test conditions and as compared to prior art systems. FIG. 4 shows along the horizontal axis the frequency in megahertz of the input composite (RF) signal, and the amount of CSO (composite second order) distortion expressed in decibels (dB) along the vertical axis. In general in these graphs the higher up along the vertical axis, the better is the distortion performance, except for FIGS. 6, 7, 9, and 10. In FIG. 4 the key at the bottom of the figure shows the various plots. The first plot labeled "CSO-Laser dBC" is the optical signal output strength at the laser itself, which is the directly modulated laser 18 in FIG. 2. The next plot is the signal strength level (in the optical domain) at the end of a 50 kilometer long optical span designated "uncompensated". This is the prior art of FIG. 1. The next plot is also for the 50 kilometer span, designated "compensated", which corresponds to the transmitter of FIG. 2, the compensation being due to the presence of the integrator, variable delay, gain circuitry, diplexer, and SBS tone generator for providing the compensation. As shown, this is a significantly better signal than along the same length of optical fiber span uncompensated. The last two plots shown are for respectively the signal strength on a 25 long kilometer span uncompensated, and on a 25 long kilometer span compensated or in accordance with FIG. 2. As shown for both the 50 kilometer and the 25 kilometer distances, the compensated present transmitter provides better performance then the uncompensated prior art transmitter.

Figure 5:
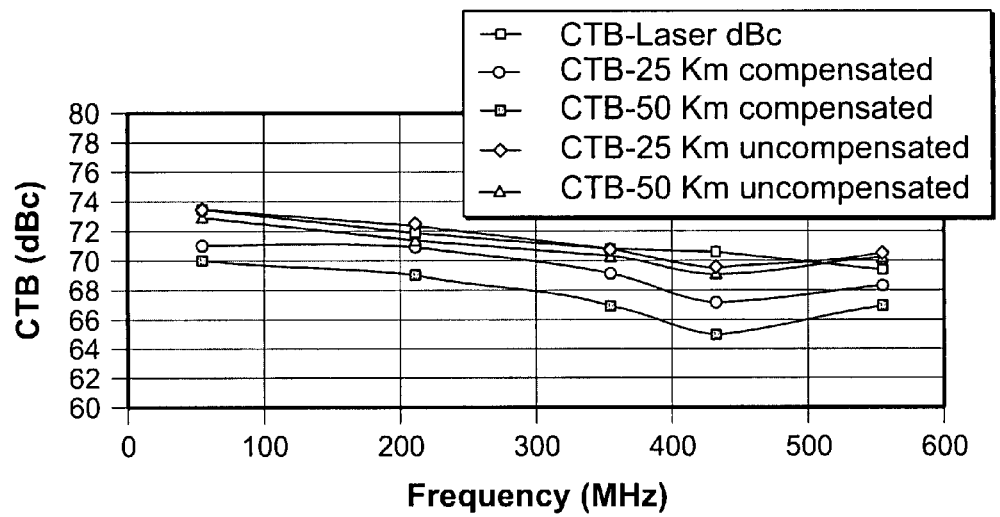

FIG. 5 shows plots using the same key legends as in FIG. 4, with the vertical axis here showing minimum degradation in the CTB (composite triple beat) distortion with and without the present type of transmitter having compensation. CTB is well known in the field and also expressed here in dB. Again, the present compensated transmitter provides better performance along both the 50 kilometer span and the 25 kilometer span than does the (prior art) uncompensated transmitter.

Figure 6:
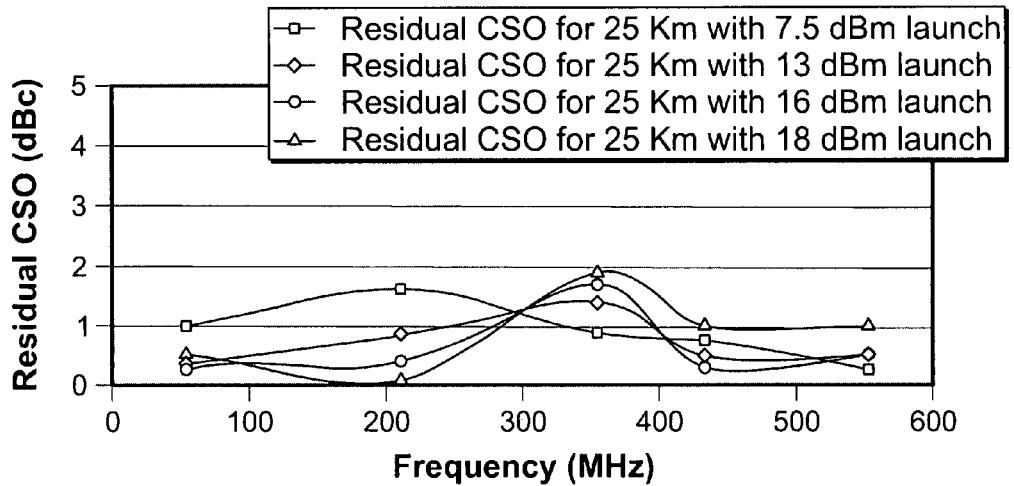
Figure 10:
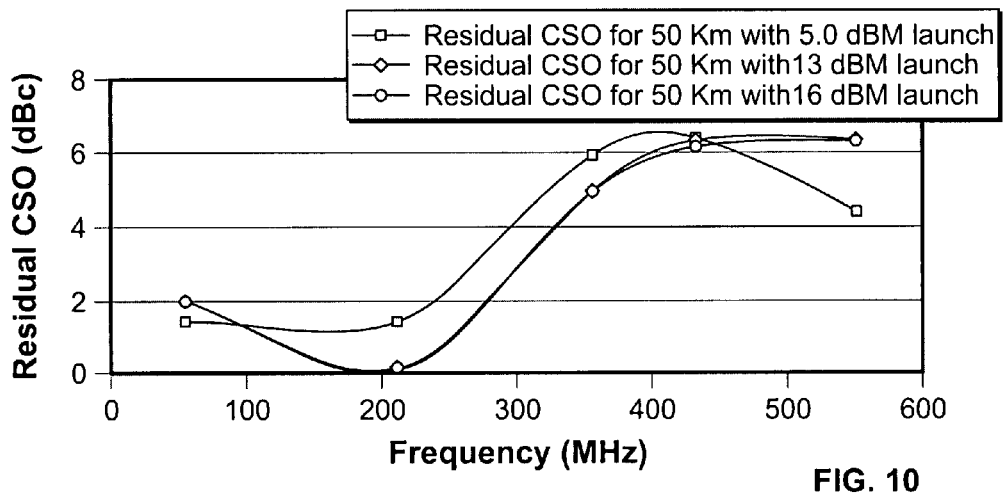

FIG. 6 shows along the vertical axis the residual CSO (composite second order) distortion achieved with the present transmitter of FIG. 2 at different optical (laser output) power levels as applied to a 25 long kilometer optical fiber span. The various "launch" optical powers shown are 7.5, 16, 13 and 18 dBM. As shown at all of these power levels, the amount of residual CSO is roughly the same, with approximately the same shape to each curve. The CSO degradation with fiber span length is severe for the high frequency channels. The approach disclosed here perfectly cancels the effect of fiber dispersion. Since the chirp is canceled, the CSO improvements are effective for all span lengths, i.e. the approach is not fiber distance dependent. Another measure of the effectiveness of the cancellation scheme is the amount of CSO degradation left uncompensated. FIGS. 6 and 10 show the effectiveness of the present scheme over frequencies of 50 to 550 MHz. Also these figures show the cancellation at different optical powers. This shows that the linear effects of the laser chirp and fiber dispersion are canceled. The CSO due to non-linear effects such as SPM (self-phase modulation), which change dramatically due to the optical launch power, plays a much smaller role in signal degradation.

Figure 7:
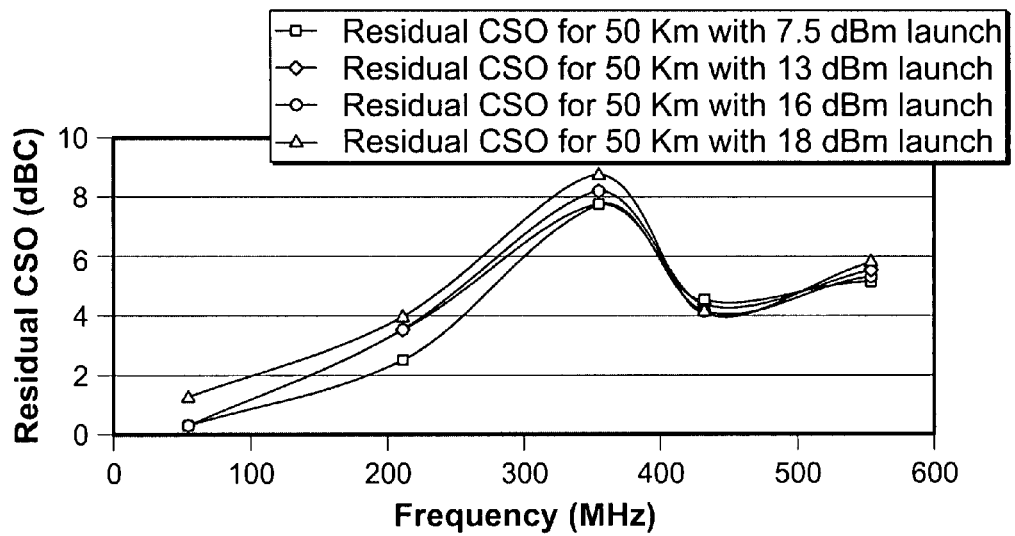

FIG. 7 is a plot similar to that of FIG. 6, but rather then being tested on a 25 long kilometer span here, the span is 50 kilometers long. The launch powers are the same as in FIG. 6. Again, in this case all four plots are very close, indicating approximately the same level of performance at each optical power.

Figure 8:
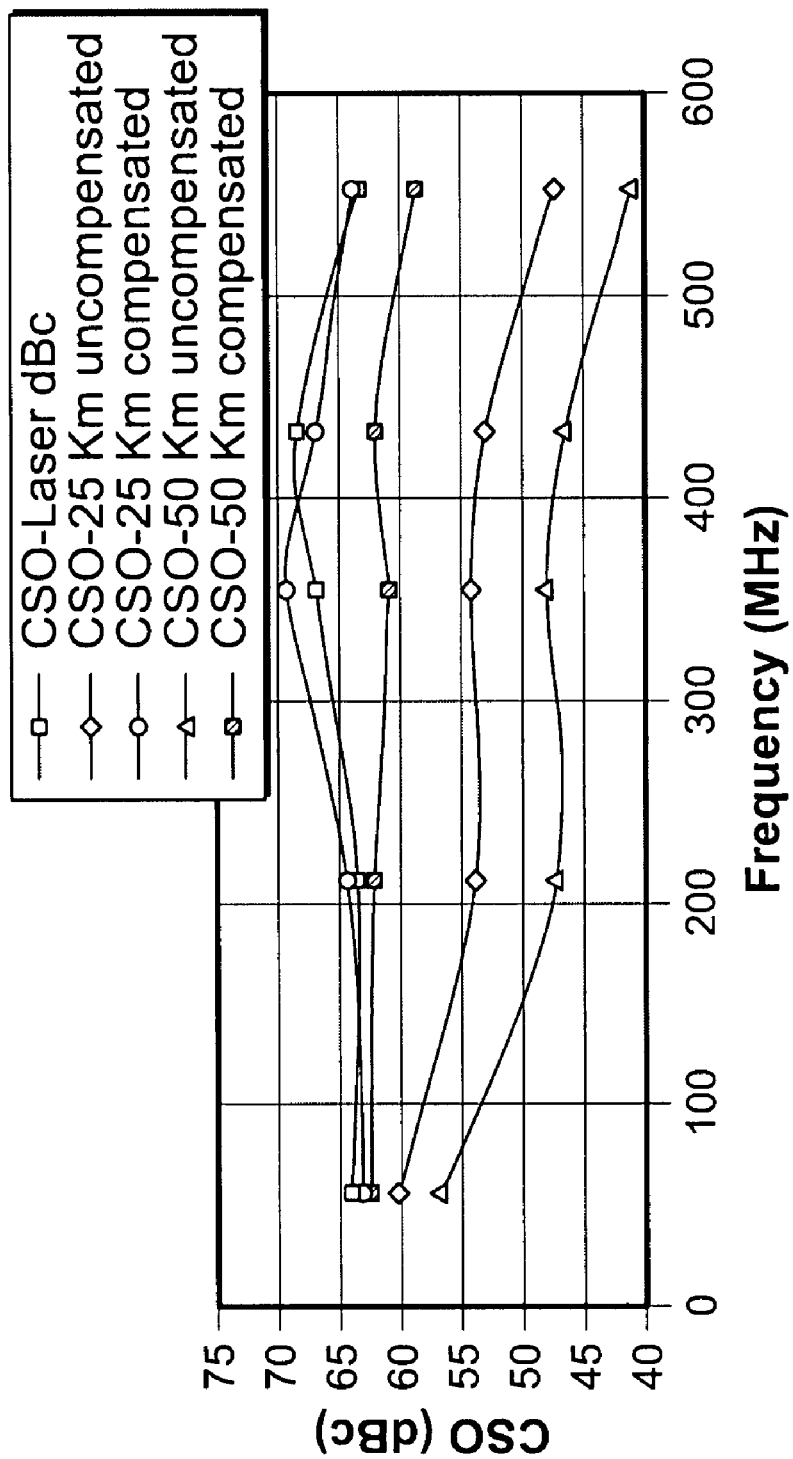

FIG. 8 is a plot similar to that of FIG. 4, except that a different type of laser is used. The laser used in the FIG. 8 test is one with a lower chirp than that of the FIG. 4 test. Note that the shapes of the plots are roughly the same as in FIG. 4, although the amount of CSO compensation is slightly higher at all frequencies than in FIG. 4.

Figure 9:
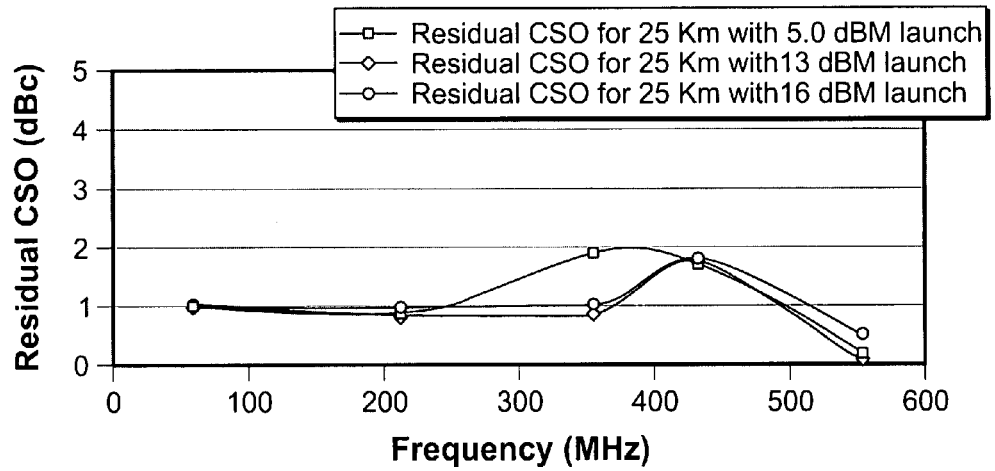

FIG. 9 shows a plot similar to that of FIG. 6, but again with a lower chirp laser used. Again, the plot is roughly the same shape as in FIG. 6.

FIG. 10 corresponds to FIG. 7 in showing the residual CSO achieved with the present transmitter at different optical powers, but again with the lower chirp laser. Here the shape of the plot is slightly different than in FIG. 7 and the amount of residual CSO is generally somewhat less.

This description is illustrative and not limiting; further modifications will be apparent to those skilled in the art in light of this disclosure and are intended to fall within the scope of the appended claims.

What is claimed as new and desired to be protected by Letters Patent of the United States is:

1. An optical transmitter comprising:
    a source of coherent light;
    an input terminal adapted to receive a radio frequency signal and coupled to drive the source of coherent light with the radio frequency signal;
    an optical modulator coupled to modulate a phase of the coherent light;
    an integrating element having transfer characteristics to cancel chirp induced by the source of coherent light and coupled to receive a portion of the radio frequency signal from the input terminal; and
    a delay element coupled to an output terminal of the integrating element, and having an output terminal coupled to control the optical modulator, wherein the integrating element and delay element change a phase of the portion of the radio frequency signal by approximately 180° to cancel or reduce, in conjunction with the optical modulator, the chirp induced by the source of coherent light.

2. The transmitter of claim 1, wherein the source of coherent light includes a laser or laser diode.

3. The transmitter of claim 1, wherein the coherent light has a wavelength in the band of 1550 mn.

4. The transmitter of claim 1, further comprising:
    an SBS suppression tone generator; and
    a diplexer element coupled to receive the SBS suppression tone and coupled to the output terminal of the delay element, and having an output terminal coupled to control the optical modulator.

5. The transmitter of claim 1, wherein the radio frequency signal is an analog video signal.

6. The transmitter of claim 5, wherein the radio frequency signal is a composite of a plurality of signals of differing frequencies.

7. The transmitter of claim 1, wherein the radio frequency signal is a digital signal.

8. The transmitter of claim 1, wherein the optical modulator is a crystal type or a semiconductor type.

9. The transmitter of claim 1, wherein the source of coherent light and the optical modulator are in a single package.

10. The transmitter of claim 1, wherein the delay element includes a variable delay element coupled to a gain amplifier.

11. The transmitter of claim 1, wherein an electrical path length of the radio frequency signal from the input terminal to the source of coherent light is of the same length as that of the portion of the radio frequency signal from the input terminal to the optical modulator.

12. The transmitter of claim 1, further comprising:
a second source of coherent light;
a second input terminal adapted to receive a second radio frequency signal and coupled to drive the second source of coherent light;
wherein the input terminal is also coupled to drive the second source of coherent light; and
an optical multiplexer coupled to combine the coherent light from both sources of coherent light and transmit the combined coherent light to the optical modulator.

13. The transmitter of claim 12, further comprising a third input terminal adapted to receive a third radio frequency signal differing in its information content from that of the second radio frequency signal and also coupled to drive the source of coherent light.

14. The transmitter of claim 12, wherein the second radio frequency signal is a quadrature amplitude modulation signal.

15. A method of transmitting an optical signal, comprising the acts of:
providing coherent light from a source;
receiving a radio frequency signal;
coupling the radio frequency signal to drive the source of coherent light;
integrating a portion of the received radio frequency signal by an integrating element having transfer characteristics to cancel chirp induced by the source of coherent light;
delaying the integrated portion of the radio frequency signal; and
applying the delayed portion of the radio frequency signal to optically modulate a phase of the coherent light, wherein the integrating and delaying change a phase of the portion of the radio frequency signal by approximately 180° at the optical modulation to cancel or reduce the chirp induced by the source of coherent light.

16. The method of claim 15, wherein the source of coherent light includes a laser or laser diode.

17. The method of claim 15, wherein the coherent light has a wavelength in the band of 1550 nm.

18. The method of claim 15, further comprising:
generating an SBS suppression tone; and
combining using a diplexer the SBS suppression tone and the delayed radio frequency signal.

19. The method of claim 15, wherein the radio frequency signal is an analog video signal.

20. The method of claim 15, wherein the radio frequency signal is a composite of a plurality of signals of differing frequencies.

21. The method of claim 15, wherein the radio frequency signal is a digital signal.

22. The method of claim 15, wherein the optical modulating is by a crystal type or a semiconductor type modulator.

23. The method of claim 15, wherein the source of coherent light and the optical modulating are performed in a single package.

24. The method of claim 15, wherein the delaying is by a variable delay amplifier.

25. The method of claim 15, wherein an electrical path length of the radio frequency signal from an input terminal to the source of coherent light is of the same length as that of the portion of the radio frequency signal from the input terminal to the point of optical modulating.

26. The method of claim 15, further comprising the acts of:
providing a second radio frequency signal and coherent light from a second source;
coupling the radio frequency signal and the second radio frequency signal to drive the second source of coherent light; and
optically modulating a phase of the coherent light from the second source of coherent light using the delayed portion of the radio frequency signal.

27. The method of claim 26, wherein the second radio frequency signal is a quadrature amplitude modulation signal.

28. An optical transmitter comprising:
a plurality of sources of coherent light;
a first input terminal adapted to receive a first radio frequency signal and coupled to drive each of the sources of coherent light;
an additional input terminal associated with each of the sources of coherent light and each adapted to receive an additional respective radio frequency signal each having differing information content from one another and coupled to drive the associated source of coherent light with the respective additional radio frequency signal;
an optical multiplexer coupled to each source of coherent light;
an optical modulator coupled to modulate a phase of the light output from the optical multiplexer;
an integrating element having transfer characteristics to cancel chirp induced by the sources of coherent light and coupled to receive a portion of the radio frequency signals from the input terminal; and
a delay element coupled to an output terminal of the integrating element, and having an output terminal coupled to control the optical modulator, wherein the integrating element and delay element change a phase of the portion of the radio frequency signal by approximately 180° to cancel or reduce, in conjunction with the optical modulator, the chirp induced by the sources of coherent light.

* * * * *